Oct. 20, 1936.　　　A. E. JURS　　　2,057,834
VALVE SYSTEM FOR DISPENSING LIQUIDS
Original Filed Jan. 14, 1935　　3 Sheets-Sheet 1
FIG_1_
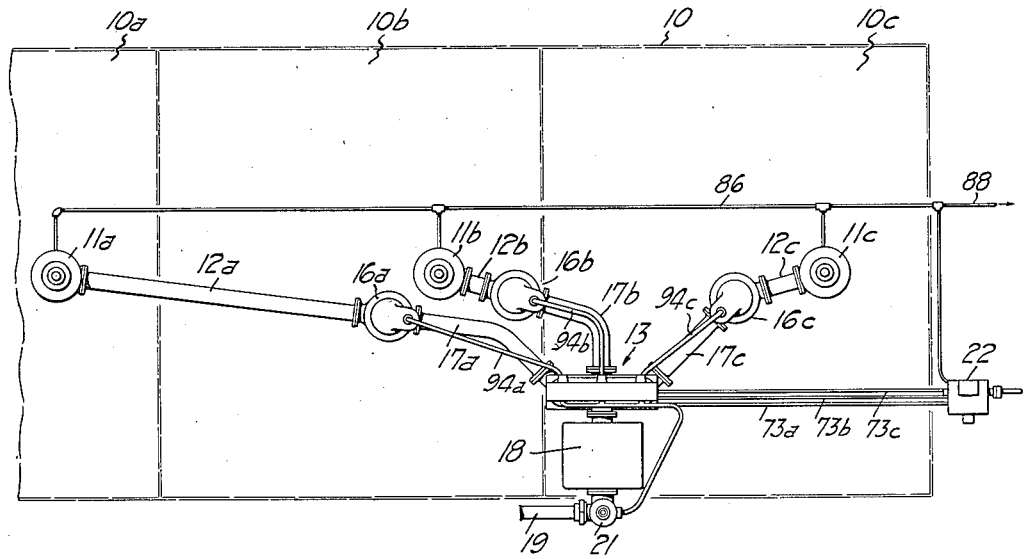
FIG_2_
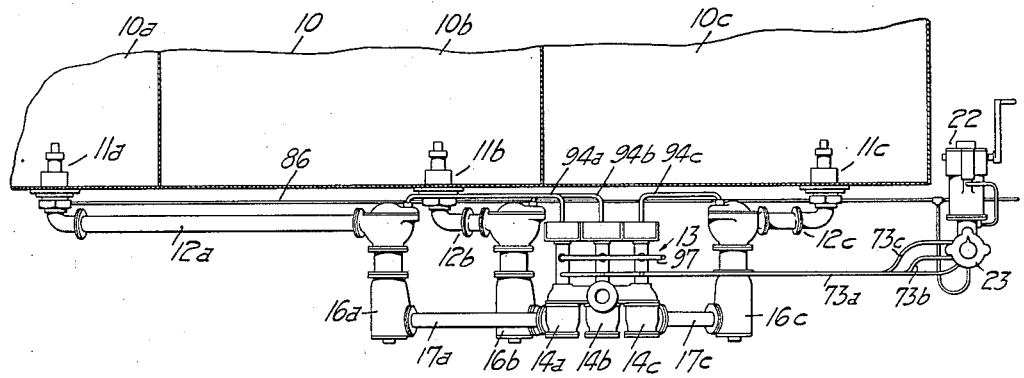
FIG_3_
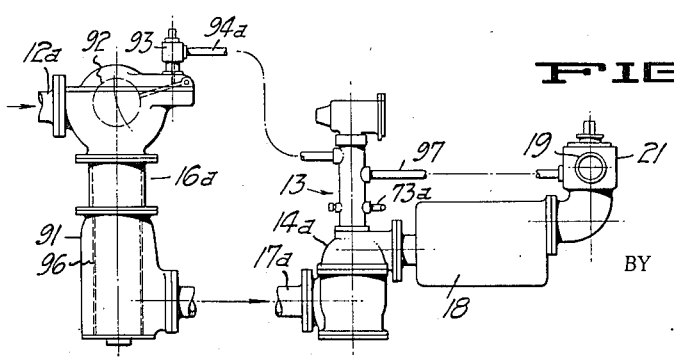
INVENTOR.
Albert E. Jurs
BY
Paul D. F. Lehr
ATTORNEY.

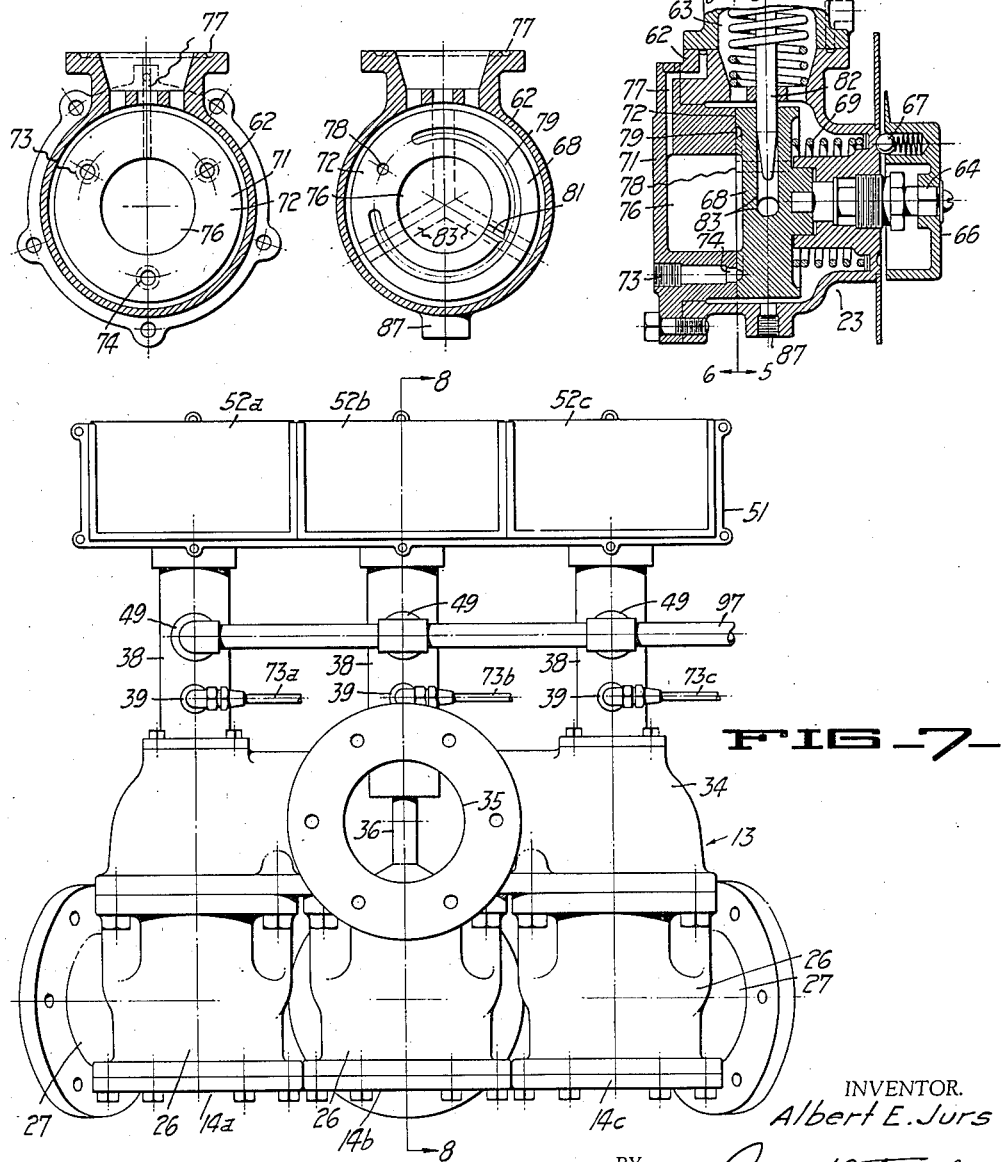

Oct. 20, 1936.   A. E. JURS   2,057,834
VALVE SYSTEM FOR DISPENSING LIQUIDS
Original Filed Jan. 14, 1935    3 Sheets—Sheet 3
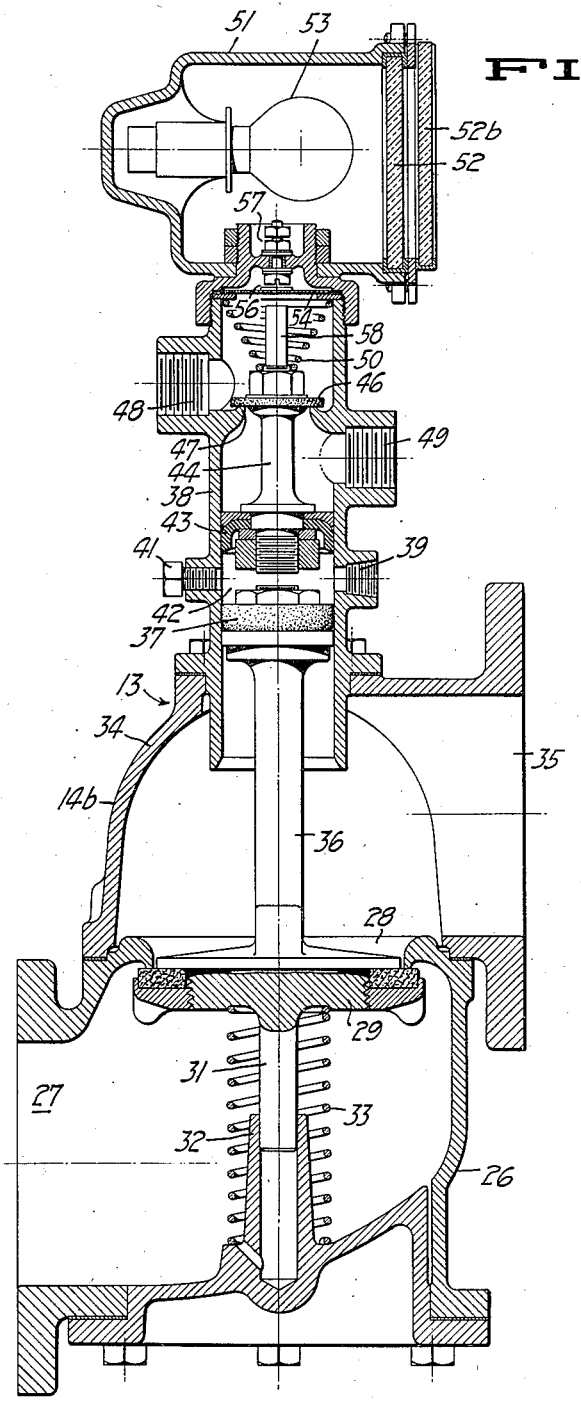
INVENTOR.
Albert E. Jurs
BY Paul D. Flehr
ATTORNEY.

Patented Oct. 20, 1936

2,057,834

UNITED STATES PATENT OFFICE 2,057,834

VALVE SYSTEM FOR DISPENSING LIQUIDS

Albert E. Jurs, Oakland, Calif.

Application January 14, 1935, Serial No. 1,684
Renewed March 16, 1936

17 Claims. (Cl. 221—67)

This invention relates generally to systems for the dispensing of liquids from tanks or tank compartments. It is adapted particularly for the dispensing of liquids which are inflammable or explosive in character, such as gasoline or oil, from the various compartments of tank trucks.

It is an object of the invention to provide a system of the above character which will make possible the utilization of a single metering device for measuring liquid dispensed selectively from tanks or tank compartments.

A further object of the invention is to provide a system of the above character which will insure against false measuring in the event the tanks or tank compartments become empty, and which will make possible convenient selective control with operation at a remote point.

Additional objects and features of the invention are as follows:—To afford signalling means whereby an operator may be assured that the liquid desired is being dispensed; to effect operation of the system in such a manner as to minimize fire hazards; and to eliminate an excessive number of faucets or dispensing hoses where any one of a number of liquids of the same general type is to be dispensed, as for example gasoline of different types.

Further objects of the invention will appear from the following description in which the preferred embodiments of the invention have been set forth in detail in conjunction with the accompanying drawings.

Referring to the drawings:

Fig. 1 is a plan view, showing my system applied to the tank compartment of a motor truck.

Fig. 2 is a side elevational view of the pieces of equipment as arranged in Fig. 1.

Fig. 3 is a side elevational view showing the manner in which the siphon breakers are associated with other parts of the equipment.

Fig. 4 is a detail, partly in cross-section, showing a type of selecting valve suitable for use in conjunction with the hydraulic actuator.

Fig. 5 is a cross-sectional detail taken along the line 5—5 of Fig. 4.

Fig. 6 is a cross-sectional detail taken along the line 6—6 of Fig. 4.

Fig. 7 is a side elevational view showing the manner in which the secondary and selectively operated valves are preferably grouped together to form one assembly unit for the equipment.

Fig. 8 is a cross-sectional detail taken along the line 8—8 of Fig. 7, on an enlarged scale.

Fig. 9 is a side elevational view of a part of the apparatus shown in Fig. 7, showing a modification in which the signalling means is omitted.

Fig. 10 is a detail, in cross-section, showing a further modification of the apparatus of Fig. 8.

Referring first to Figs. 1 and 2, there is shown a tank 10, which may be presumed to be mounted upon a motor truck, with the tank divided into separate compartments 10a, 10b and 10c. Mounted upon the bottom wall of each of the tank compartments are the fluid pressure-operated valve units 11a, 11b and 11c. These primary valve units may be similar in construction to those described in Patent No. 1,960,831, being normally biased towards closed position, but being opened by application of hydraulic pressure.

Outside the tank the valve units connect with pipes or conduits 12a, 12b and 12c, which serve to convey the gasoline or like liquid flowing from the tank compartments when the valve units are opened. The conduits just mentioned serve to convey liquid to the secondary valve assembly 13, which, as will be presently explained, is formed to afford separate secondary valves 14a, 14b and 14c.

For reasons which will be made apparent, it is desirable to interpose the siphon breakers 16a, 16b and 16c, between the assembly 13 and the valve units 11a, 11b and 11c. Thus, the conduits 12a, 12b and 12c are shown connected to the siphon breakers, and the siphon breakers are in turn shown connected to the inflow sides of the secondary valves 14a, 14b and 14c, by the conduits 17a, 17b and 17c. The outflow side of the assembly 13 connects with a suitable liquid meter 18, which in turn connects to the dispensing hose or conduit 19 through the faucet 21.

Actuation of the system to dispense liquid is effected by a suitable source of fluid under pressure, such as the hydraulic actuator 22, in conjunction with a selecting valve 23. To afford a preliminary understanding, it may be explained at this point that upon operation of the actuator 22 to effect application of liquid under pressure, all of the primary valve units are opened simultaneously, while a selected one of the secondary valves is operated, depending upon the positioning of the selecting valve 23.

A suitable detailed construction for the assembly 13 is shown in Figs. 7 and 8. Each of the secondary valves 14a, 14b and 14c consists of a hollow body part 26, provided with an inflow opening 27 to receive liquid from the associated tank compartment. Disregarding permissible variations in design, for the poppet type of valve illustrated a stationary annular valve seat 28 is afforded, which is engaged by a movable valve disc 29. A pin 31 extends downwardly from the disc and is slidably guided in a bore formed in body portion 32. Compression spring 33 serves to bias or urge the valve disc towards closed position. Secured to the lower body part 26 there is an upper body part 34 which, instead of being made individual for each of the secondary valves, can be extended to form an outflow manifold for all of the valves, as shown in Fig. 7. Opening 35 is provided for connecting with the meter 18.

Extending inwardly from each valve disc 29 there is a rod 36, which has its upper end secured to a piston 37. Pistons 37 operate within the cylinders 38, which in turn are properly positioned and mounted upon the body part 34. Immediately above each piston 37, the corresponding cylinder 38 is provided with a connecting opening 39 for attachment to a tube or pipe leading to the selecting valve 23. It is also desirable to provide the cylinder with another opening, normally closed by a plug 41, whereby, upon removal of this closure, trapped air can be bled from the pressure chamber 42.

In that form of the invention shown in Fig. 8, the upper side of chamber 42 is defined by a second piston 43. Connected to the piston 43 by means of stem 44, there is a valve disc 46. This disc normally rests upon a stationary annular valve seat 47 and serves to control communication between the pipe-connecting openings 48 and 49. A spring 50 can be provided to bias disc 46 towards closed position.

The signalling means afforded for the modification of Fig. 8 is constructed as follows:—Extending over all of the cylinders 38 there is a housing 51 which is divided into separate compartments corresponding to the secondary valves. The forward faces of these compartments are covered by transparent windows 52, over which the removable panels 52a, 52b and 52c may be positioned. The panels can be made of glass in various colors and may be lettered to designate the various types of gasoline or other liquids being dispensed. Within each of the compartments of housing 51 there is an electric lamp 53, which is connected to a suitable electric circuit. The circuit for each lamp includes a pair of contacts, which are so associated with the remainder of the system that they are closed automatically during a dispensing operation. Thus, as shown in Fig. 8, extending across the upper end of each cylinder 38 there is a diaphragm 54 which serves as a closure for the cylinder and which also serves to carry the electrical contact 56. Co-operating with the contact 56 there is a stationary insulated contact 57. Extending upwardly from the stem 44, above disc 46, there is a pin 58, which when the disc 46 is closed upon its seat 47 terminates short of the diaphragm 54. However, when pin 58 is forced upwardly, as by introducing liquid under pressure into chamber 42, diaphragm 54 is flexed to close the contacts 56 and 57 and thus light lamp 53.

In some instances, the signalling or indicating means as described above may not be required. In such cases, the housing 51 and its associated parts are omitted, and in place of diaphragm 54 with its associated contacts 56 and 57, the upper ends of cylinders 38 are closed by caps 59 (Fig. 9).

The hydraulically operated check valve, afforded by disc 46 in conjunction with seat 47, co-operates with the siphon breakers 16a, 16b and 16c. Where it is desired to omit such siphon breakers, as may be the case in some instances, a modification of Fig. 8 can be utilized, such as is indicated in Fig. 10. Thus, in place of cylinders 38, a modified form of cylinder 138 is employed, which is shorter in length and which has a closed upper end. The connecting opening 39 and the closure plug 41 may be located at any desired point above the piston 37, as for example in the upper end of the cylinder, whereby trapped air may be bled from the closed chamber 142 (corresponding to chamber 42 of Fig. 8).

The hydraulic actuator 22 employed can be similar in construction to the actuator disclosed in Patents Nos. 1,960,831 and 1,976,445. As disclosed in the second mentioned patent, it is desirable to provide a volumetric displacement somewhat in excess of the amount of liquid required for effecting hydraulic operation of the various valves, with means for by-passing excess liquid back to the auxiliary reservoir of the actuator. As shown in Fig. 4, the selecting valve 23 can be carried upon the actuator 22, similarly to the arrangement disclosed in said Patent No. 1,960,831. In this instance, however, the selecting valve is of the disc type and can be briefly described as follows:—Secured to the lower end of the actuator housing, there is a body 62 which is formed hollow and which has its interior in communication with the liquid pressure chamber 63 of the actuator. Journaled in the body 62 there is a shaft 64, the outer end of which carries an operating knob 66. A spring-pressed detent 67 enables the operator to determine the several selecting positions. The inner end of shaft 64 is coupled to an annular valve member 68 of the disc type. A compression spring 69 serves to urge the valve member 68 against the inner face of a body part 71, the annular areas in contact being suitably machined to form the valve working surfaces 72. The body part 71 is provided with a plurality of pipe-connecting openings 73, which in turn communicate with ports 74. These ports communicate with the valve working surfaces 72 and are located at spaced circumferential points in conformance with the different selecting positions for the valve member 68. The interior 76 of body part 71 is in communication with the auxiliary reservoir of the actuator 22, by means of duct 77. Extending through the valve member 68 there is a duct 78 which is adapted to register with the ports 74 for the different selecting positions of knob 66. Likewise formed in the working face of valve member 68 there is an arcuate groove 79 which communicates with all of the ports 74 except that port which is in registry with port 78 for a particular selecting position. Groove 79 is at all times in communication with space 76, by means of channel 81.

As disclosed in said Patent No. 1,960,831, it is desirable to positively lock the selecting valve member 68 in a selected position during a dispensing operation. In the modification being described, the piston of the hydraulic actuator carries a depending rod 82, the lower end of which is adapted to enter any one of a plurality of circumferentially spaced openings 83 formed in the valve member 68. When the piston of the hydraulic actuator is in retracted position, rod 82 is likewise retracted with respect to valve member 68, so that an operator is free to set the selecting valve to any desired position. However, if the piston of the actuator moves downwardly towards actuating position, rod 82 enters one of the openings 83, thus securely locking valve member 68 against further rotation.

The various hydraulic pressure connections for the equipment described above are illustrated in Figs. 1 and 2. Thus, all of the primary valve units 11a, 11b and 11c are connected to a common pressure line 86, which leads to the actuator 22. As illustrated in Fig. 3, this pipe is attached to the connecting opening 87 whereby it is at all times in communication with the pressure chamber 63 of the actuator. A branch pipe 88, connecting with pipe line 86, may lead to a pressure operated device such as disclosed in co-pending application Serial No. 687,038, filed August 28, 1933, Pat. 2,002,757, for controlling the ignition circuit of the motor truck. Hydraulic pressure pipe lines 73a, 73b and 73c are attached to the connecting opening 39 of the respective stationary valves 14a, 14b and 14c, and extend into the selecting valve 23, where they are attached to the respective connecting openings 73. Thus, when the hydraulic actuator 22 is operated, all of the primary valve units 11a, 11b and 11c are simultaneously opened, but only a selected one of the secondary valves 14a, 14b and 14c is operated, to permit flow of liquid from one of the tank compartments, through meter 18 and faucet 21, to the dispensing conduit 19.

The siphon breakers and the association of these devices with the other equipment described, may be best understood by reference to Fig. 3. Omitting structural details, each breaker is formed of a hollow body 91, through which the liquid is caused to flow. Arranged within the upper part of the body there is a movable float 92, adapted to operate a small valve 93. The valves 93, when opened serve to vent pipes 94a, 94b and 94c to the atmosphere. When a tank compartment from which liquid is being dispensed becomes emptied, it is evident that the level of liquid in body 91 falls, with the result that lowering of float 92 opens valve 93 to vent one of the pipes 94a, 94b and 94c. The lower part of the body 91 can be conveniently provided with a screen 96, through which the liquid must pass. The pipes 94a, 94b and 94c, for the respective corresponding siphon breakers, lead to the connecting openings 48 for the respective secondary valves 14a, 14b and 14c (Fig. 1). The openings 49 for all of the secondary valves connect to a common pipe 97, leading to the faucet 21. Since during a dispensing operation a selected one of the secondary valves has the associated valve disc 46 in open position, it is evident that any venting caused by operation of the associated siphon breaker, serves to admit air to pipe 97 and to the upper part of faucet 21, so that any continued siphoning action, such as would draw air into the meter 18, is arrested. In this connection it should be noted that during many dispensing operations the discharge end of conduit 19 is at a relatively low level, compared to the elevation of the meter 18. Thus, without a siphon breaking arrangement such as described, the emptying of a tank compartment might cause all of the liquid to be exhausted from the meter, with a drawing-in of air through the meter, and with a resulting false meter reading. With the siphon breaker arrangement, however, the meter is always maintained filled with liquid, irrespective of whether or not a tank compartment is exhausted of liquid.

To review operation of the system as a whole, if the operator desires to dispnse a particular type of gasoline, knob 66 on the selecting valve 23 is set to a proper position, and the handle of the actuator 22 is operated. Assuming that the secondary valve 14b is selected for operation, all of the primary valves 11a, 11b and 11c are opened, secondary valve 14b is opened, but secondary valves 14a and 14c remain closed. Assuming that the modification shown in Fig. 7 is employed, simultaneously with opening of secondary valve 14b by virtue of downward movement of its piston 37, piston 43 is raised to open its valve disc 46, and to close the electrical contacts 56 and 57, thus insuring proper breaking of siphon action in the event the tank compartment selected becomes emptied, and also causing illumination of that lamp 53 which is associated with panel 52b, to visually indicate the selection to the operator. If a different type of gasoline is desired, selecting valve 23 is set accordingly, to secure operation in the same manner as explained above. It will be observed that when selecting a particular type of liquid to be dispensed, followed by a dispensing operation, the first liquid discharged will be mixed with a small amount of the liquid previously dispensed, which has remained in the meter and in the liquid space afforded by the body part 34 of the secondary valve. However, in many instances such contamination is not objectionable, and in the equipment as described it is maintained at a minimum value.

The system described can be elaborated or simplified according to various requirements. For example, more than three secondary valves can be employed where a greater number of liquids are to be selectively dispensed. The sequence of operation of the valves and the signalling means may vary in accordance with different requirements of an operation of the actuator. In general, it is desirable that the tension of spring 50 be such that a signal lamp is first lighted, so that an operator may correct a possible error of selection before opening the valves. In certain installations, the selected valve disc 46 is opened after operation of the signal lamp, after which all of the primary valves are opened, and lastly the selected secondary valve is opened.

I claim:

1. In a valve control system for dispensing liquids from tanks or tank compartments, a plurality of separate primary valve units associated with the tank compartments and serving when opened to permit flow of liquid from the tank compartments, a plurality of secondary valves, liquid flow conduits serving to connect the primary valve units with said secondary valves, an outflow conduit adapted to receive liquid from the outflow side of all of said secondary valves, and means for effecting simultaneous operation of all of said primary valve units and selective operation of said secondary valves, said last means precluding operation of a secondary valve not selected for operation.

2. In a valve control system for dispensing liquids from tanks or tank compartments, a plurality of separate primary valve units associated with the tank compartments, each of said valve units when opened serving to permit flow of liquid from its associated tank compartment, an operating member, means serving to connect said operator with said primary valve units whereby upon movement of the operator all of said valve units are opened in unison, a single liquid dispensing conduit, a plurality of secondary valves having their outflow sides connected to said dispensing conduit, a plurality of separate liquid conduits connecting the inflow sides of said secondary valves with said primary valve units whereby each valve unit has a separate liquid flow connection with the inflow side of an associated secondary valve, means serving to effect selective operation of any one of said secondary valves by movement of said operating member, and means serving to break the siphoning action of said dispensing conduit when the level of liquid being dispensed from the compartments falls to a predetermined value.

3. In a valve control system for dispensing liquids from tanks or tank compartments, a plurality of separate primary valve units associated with said tank compartments, each of said valve units when opened serving to permit flow of liquid from its associated tank compartment, a plurality of secondary valves, liquid flow conduits connecting said primary valve units with said secondary valves, a common dispensing conduit connected to the outflow sides of said secondary valves, means for effecting simultaneous operation of all of said primary valve units and selective individual operation of said secondary valves, and signalling means for indicating the secondary valve selected for operation.

4. In a valve control system for dispensing liquids from tanks or tank compartments, a plurality of separate primary valve units associated with the tank compartments, each of said valve units when opened serving to permit flow of liquid from its associated tank compartment, a plurality of secondary valves, liquid flow conduits connecting the primary valve units with the inflow sides of said secondary valves, a meter adapted to receive flow of liquid from all of the secondary valves, a dispensing conduit connected to the outflow side of the meter, a plurality of vent pipes connected to the dispensing conduit at a point above the level of the meter, valves serving to control communication of said vent pipes to the atmosphere, means responsive to emptying of the tank compartments for effecting operation of said last mentioned vent valves, a plurality of check valves interposed in the vent pipes and corresponding in number to the number of secondary valves, each of said valves being normally urged toward closed position, and means for effecting simultaneous operation of all of the primary valve units, selective individual operation of said secondary valves, and selective opening of a corresponding check valve.

5. In a valve control system for dispensing liquids from tanks or tank compartments, a plurality of separate primary valve units adapted to be operated by application of fluid pressure, said valve units when opened by fluid pressure serving to permit flow of liquid from the tank compartments, a plurality of secondary valves adapted to receive liquid from said primary valve units, and means including a source of fluid pressure for effecting simultaneous operation of all of said primary valve units and selective individual operation of said secondary valves.

6. In a valve control system for dispensing liquids from tanks or tank compartments, a plurality of separate primary valve units associated with the tank compartments and adapted to be operated by application of fluid pressure, said primary valve units when opened by fluid pressure serving to permit flow of liquid from the tank compartments, a plurality of fluid pressure-operated secondary valves, liquid flow conduits serving to connect the primary valve units with said secondary valves, an outflow conduit adapted to receive liquid from the outflow side of all of said secondary valves, and means including a source of fluid pressure for effecting simultaneous operation of all of said primary valve units and selective operation of said secondary valves.

7. In a valve control system for dispensing liquids from tanks or tank compartments, a plurality of separate valve units adapted to be operated by application of fluid pressure, said valve units when opened by fluid pressure serving to permit flow of liquid from the tank compartments, a fluid pressure actuator, fluid connections between the actuator and the valve units, whereby upon application of fluid pressure by the actuator all of said valve units are opened in unison, a single liquid dispensing conduit, a plurality of secondary fluid pressure-operated valves having their outflow sides connected to said dispensing conduit, a plurality of liquid flow conduits connecting the inflow sides of said last-mentioned secondary valves with said valve units whereby each valve unit has a liquid flow connection with the inflow side of an associated secondary valve, and means for selectively connecting any one of said secondary valves to said actuator for effecting operation of a selected one of the same upon application of fluid pressure.

8. In a valve control system for dispensing liquids from tanks or tank compartments, a plurality of separate valve units adapted to be operated by application of hydraulic pressure, each of said valve units when opened serving to permit flow of liquid from the tank compartment with which it is associated, a hydraulic pressure actuator, hydraulic connections between the actuator and the valve units whereby upon operation of the actuator all of said valve units are opened in unison, a single liquid dispensing conduit, a plurality of hydraulically operated secondary valves having their outflow sides connected to said dispensing conduit, a plurality of liquid flow conduits connecting the inflow sides of said secondary valves with said valve units whereby each valve unit has a liquid flow connection with the inflow side of an associated secondary valve, and means for selectively connecting any one of said secondary valves to said hydraulic actuator for effecting operation of a selected one of said secondary valves upon operation of said actuator.

9. In a valve control system for dispensing liquids from tanks or tank compartments, a plurality of separate valve units associated with the tank compartment and adapted to be operated by application of hydraulic pressure to effect opening of the same, each of said valve units when opened serving to permit flow of liquid from its associated tank compartment, a hydraulic pressure actuator, hydraulic connections between the actuator and the valve units whereby upon operation of the actuator all of said valve units are opened in unison, a single liquid dispensing conduit, a plurality of hydraulically operated secondary valves having their outflow sides connected to said dispensing conduit, a plurality of separate liquid conduits connecting the inflow sides of said secondary valves with said valve units whereby each valve unit has a separate liquid flow connection with the inflow side of an associated secondary valve, means including a selector valve for selectively establishing hydraulic connection between any one of said secondary valves and said hydraulic actuator, thereby effecting operation of a selected one of said secondary valves upon operation of said hydraulic operator, and means serving to break the siphoning action of said dispensing conduit when the level of liquid being dispensed from the compartments falls to a predetermined value.

10. In a valve control system for dispensing liquids from tanks or tank compartments, a plurality of separate primary valve units associated with said tank compartments and adapted to be operated by application of fluid pressure to effect opening of the same, each of said valve units when opened serving to permit flow of liquid from its associated tank compartment, a plurality of secondary valves adapted to be operated by fluid pressure to effect opening of the same, liquid flow conduits connecting said primary valve units with said secondary valves, a common dispensing conduit connected to the outflow sides of said secondary valves, means including a source of fluid pressure for effecting simultaneous operation of all of said primary valve units and selective individual operation of said secondary valves, and signalling means for indicating the secondary valve selected for operation.

11. In a valve control system for dispensing liquids from tanks or tank compartments, a plurality of separate primary valve units associated with said tank compartments and adapted to be operated by application of fluid pressure to effect opening of the same, each of said valve units when opened serving to permit flow of liquid from its associated tank compartment, a plurality of secondary valves adapted to be operated by fluid pressure to effect opening of the same, liquid flow conduits connecting said primary valve units with said secondary valves, a common dispensing conduit connected to the outflow sides of said secondary valves, means including a source of fluid pressure for effecting simultaneous operation of all of said primary valve units and selective individual operation of said secondary valves, and signalling means operative responsive to application of fluid pressure from said source for indicating the secondary valve selected for operation.

12. In a valve control system for dispensing liquids from tanks or tank compartments, a plurality of separate primary valve units associated with the tank compartments and adapted to be operated by application of fluid pressure to effect opening of the same, each of said valve units when opened serving to permit flow of liquid from its associated tank compartment, a plurality of secondary valves adapted to be opened by application of fluid pressure, liquid flow conduits connecting the primary valve units with the inflow sides of said secondary valves, a meter adapted to receive flow of liquid from all of the secondary valves, a dispensing conduit connected to the outflow side of said meter, a plurality of vent pipes connected to the dispensing conduit at a point above the level of the meter, valves serving to control communication of said vent pipes to the atmosphere, means responsive to emptying of the tank compartments for effecting opening of said last-mentioned vent valves, a plurality of check valves interposed in said vent pipes and corresponding in number to the number of secondary valves, and actuating means including a source of fluid under pressure for effecting simultaneous operation of all of said primary valve units, selective individual operation of said secondary valves, and selective actuation of a corresponding check valve to effect opening of the same.

13. In a valve control system for dispensing liquids from tanks or tank compartments, a plurality of separate primary valve units associated with the tank compartments, each of said valve units when opened, serving to permit flow of liquid from its associated tank compartment, a plurality of secondary valves, liquid flow conduits connecting the primary valve units with the inflow sides of said secondary valves, a meter adapted to receive flow of liquid from all of the said secondary valves, a dispensing conduit connected to the outflow side of the meter, a plurality of vent pipes connected to the dispensing conduit at a point above the level of the meter, valves serving to control communication of said vent pipes to the atmosphere, means responsive to emptying of the tank compartments for effecting operation of said last mentioned vent valves, a plurality of check valves interposed in the vent pipes and corresponding in number to the number of secondary valves, each of said valves being normally urged toward closed position, and actuating means for effecting selective opening of a check valve responsive to selective opening of a corresponding secondary valve.

14. In a valve control system for dispensing liquids from tanks or tank compartments, a plurality of separate primary valve units associated with the tank compartments, and serving when opened to permit flow of liquid from the tank compartments, a plurality of secondary valves, liquid flow conduits serving to connect the primary valve units with said secondary valves, an outflow conduit adapted to receive liquid from the outflow side of all of the secondary valves, and means for effecting opening of said primary valve units and selective operation of said secondary valves, said last means precluding operation of a secondary valve not selected for operation.

15. In a valve control system for dispensing liquids from tanks or tank compartments, a plurality of separate primary valve units associated with the tank compartments, each of said valve units when opened serving to permit flow of liquid from its associated tank compartment, a single liquid dispensing conduit, a plurality of secondary valves having their outflow sides connected to said dispensing conduit, a plurality of separate liquid conduits connecting the inflow sides of said secondary valves with said primary valve units whereby each valve unit has a separate liquid flow connection with the inflow side of an associated secondary valve, means serving to effect selective operation of any one of said secondary valves, and means serving to break the siphoning action of said dispensing conduit when the level of liquid being dispensed from the compartments falls to a predetermined value.

16. In a valve control system for dispensing liquids from tanks or tank compartments, a plurality of separate primary valve units adapted to be operated by application of fluid pressure, said valve units when opened by fluid pressure serving to permit flow of liquid from the tank compartment, a plurality of secondary valves adapted to receive liquid from said primary valve units, and means including a source of fluid pressure for effecting operation of said primary valve units and selective individual operation of said secondary valves.

17. In a valve control system for dispensing liquids from tanks or tank compartments, a plurality of separate primary valve units associated with said tank compartment, and serving when opened to permit flow of liquid from the tank compartments, a plurality of secondary valves adapted to be operated by hydraulic pressure, liquid flow conduits serving to connect the primary valve units with said secondary valves, an outflow conduit adapted to receive liquid from the outflow side of all of the secondary valves, and means for effecting opening of said primary valve units and selective hydraulic operation of said secondary valves, said last means precluding operation of a secondary valve not selected for operation.

ALBERT E. JURS.